Patented Mar. 31, 1942

2,277,680

UNITED STATES PATENT OFFICE 2,277,680

INSECTICIDE

Euclid W. Bousquet, Wilmington, Del., assignor to E. I. du Pont de Nemours & Company, Wilmington, Del., a corporation of Delaware No Drawing. Original application July 26, 1934, Serial No. 737,046. Divided and this application February 1, 1941, Serial No. 376,991

4 Claims. (Cl. 167—33)

The present invention relates to insecticides which are water insoluble compounds of the general formula

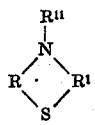

in which R and $R^1$ are aromatic nuclei and $R^{11}$ is hydrogen or any hydrocarbon radical, R, $R^1$ and $R^{11}$ being free from substituents which impart water solubility to the compounds.

The prototype of these compounds is thio-diphenyl-amine, which is produced, for instance, by heating diphenyl-amine with sulfur in the presence of a catalyst, such as aluminum chloride, ferric chloride, iodine, etc.

Other members of the novel group of insecticides according to my invention are the thio compounds obtained by the action of sulfur upon diarylamines such as, for instance, those obtained from phenyl-alpha-naphthyl amine which presumably has the formula

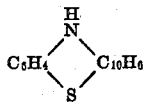

or from phenyl-beta-naphthylamine,

Di-alpha-naphthylamine,
Di-beta-naphthylamine,
Di-biphenylamine,
N,N-diphenyl-p-phenylenediamine,
N,N-di-alpha-naphthyl-para-phenylene-diamine,
N,N-di-biphenyl-metaphenylene-diamine,
N,N-di-phenyl-metaphenylene-diamine,
N,N-di-phenyl-benzidine,
p,p-Di-(phenyl-amino) di-phenylamine,
N-methyl-di-phenylamine, etc.

The thio derivatives obtained from these diaryl-amines are all characterized by containing the heterocyclic nucleus

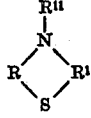

in which R and $R^1$ are aromatic nuclei in each of which 2 adjacent carbon atoms take part in forming the heterocyclic carbon-nitrogen-sulfur ring, and $R^{11}$ is hydrogen or a hydrocarbon radical.

Some of the hydrogen atoms normally attached to R, $R^1$ and $R^{11}$ may be substituted, or replaced, by alkyl, cycloalkyl, aryl, hetero-cyclic nuclei, or halogen, nitro, amino, alkoxy or aryloxy groups, which do not impart water solubility to the compounds. Water solubilizing groups which are not desired in my novel insecticides are sulfonic—$SO_3H$, or carboxylic—$COOH$ groups.

The above compounds can conveniently be designated as water insoluble thio-di-arylamines and I found that such thio-di-aryl-amines have generally the properties of being toxic to insects, as stomach poisons as well as contact insecticides.

My novel insecticides can be used as such in the form of dusts mixed with inert diluent such as kieselguhr, silica, talc, finely divided carbon, etc.

I may also use the water insoluble thio-di-arylamines in the form of dispersions in aqueous systems with spreading, emulsifying, wetting agents or stickers, such as soaps, sulfonated vegetable oils, sulfonated animal or mineral oils, alkylated naphthalene sulfonic acids, sulfonated higher alcohols containing, for instance, more than 8 carbon atoms, casein, waste sulfite liquor, vegetable oils, refined mineral oils, starch or other carbohydrates, etc. I can also incorporate in my dusts or sprays other insecticidal or fungicidal compositions such as nicotine, lime, sulfur, lauryl-rhodanate, lime-sulfur, and particularly fungicides of alkaline reaction with which the thio-di-arylamines are particularly compatible.

My novel thio-di-arylamines are applicable particularly to the control of such plant pests for which arsenicals are commonly used, they have over arsenicals the great advantage that they do not leave a poisonous arsenical or metallic residue on the fruits or vegetables.

My novel water insoluble thio-di-arylamines have furthermore the property that they are not easily washed off by rain or sprinkling and in this respect they are to be preferred over water soluble compounds.

This application is a division of my copending application Serial No. 737,046, filed July 26, 1934.

I claim:

1. An insecticidal composition containing as an essential active ingredient a water insoluble sulfurized N,N-diaryl-arylenediamine characterized in that at least one of the aryl groups is linked to the arylene group in a 1,4-thiazine ring structure.

2. An insecticidal composition containing as an essential active ingredient a water insoluble sulfurized N,N-diaryl-phenylenediamine characterized in that at least one of the aryl groups is linked to the phenylene group in a 1,4-thiazine ring structure.

3. An insecticidal composition containing as an essential active ingredient a water insoluble sulfurized N,N-diphenyl-arylenediamine characterized in that at least one of the phenyl groups is linked to the arylene group in a 1,4-thiazine ring structure.

4. An insecticidal composition containing as an essential active ingredient a water insoluble sulfurized N,N-diphenyl-phenylenediamine characterized in that at least one of the phenyl groups is linked to the phenylene group in a 1,4-thiazine ring structure.

EUCLID W. BOUSQUET.